April 12, 1966  J. F. HEYER  3,245,512
CARRIAGE RAILS AND METHOD AND APPARATUS OF MANUFACTURE
Filed March 22, 1963  3 Sheets-Sheet 1
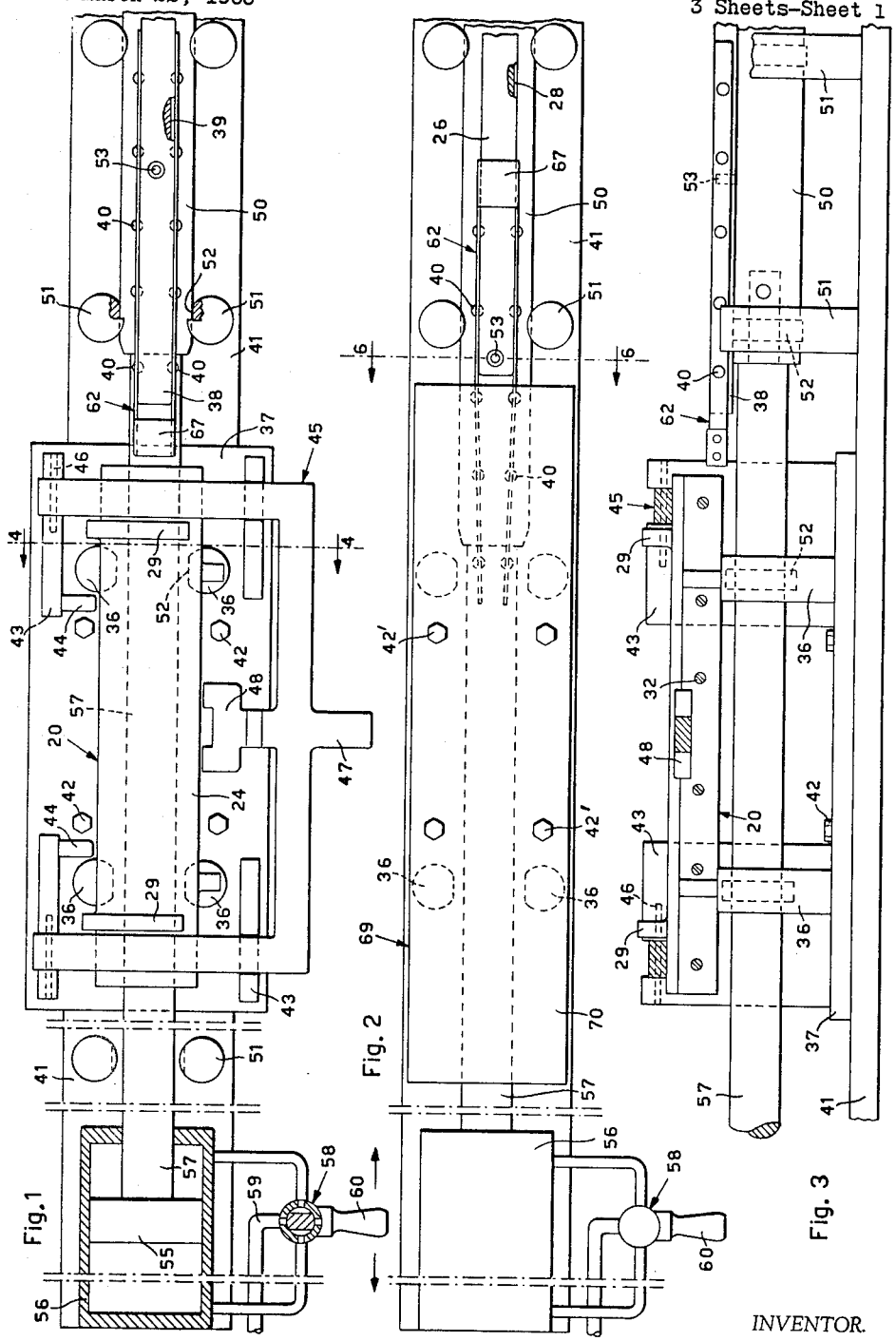
INVENTOR.
John F. Heyer
BY
John Toggenburger
AGENT April 12, 1966   J. F. HEYER   3,245,512
CARRIAGE RAILS AND METHOD AND APPARATUS OF MANUFACTURE
Filed March 22, 1963   3 Sheets-Sheet 2

INVENTOR.
John F. Heyer
BY
John Toggenburger
AGENT

April 12, 1966  J. F. HEYER  3,245,512
CARRIAGE RAILS AND METHOD AND APPARATUS OF MANUFACTURE
Filed March 22, 1963  3 Sheets-Sheet 3
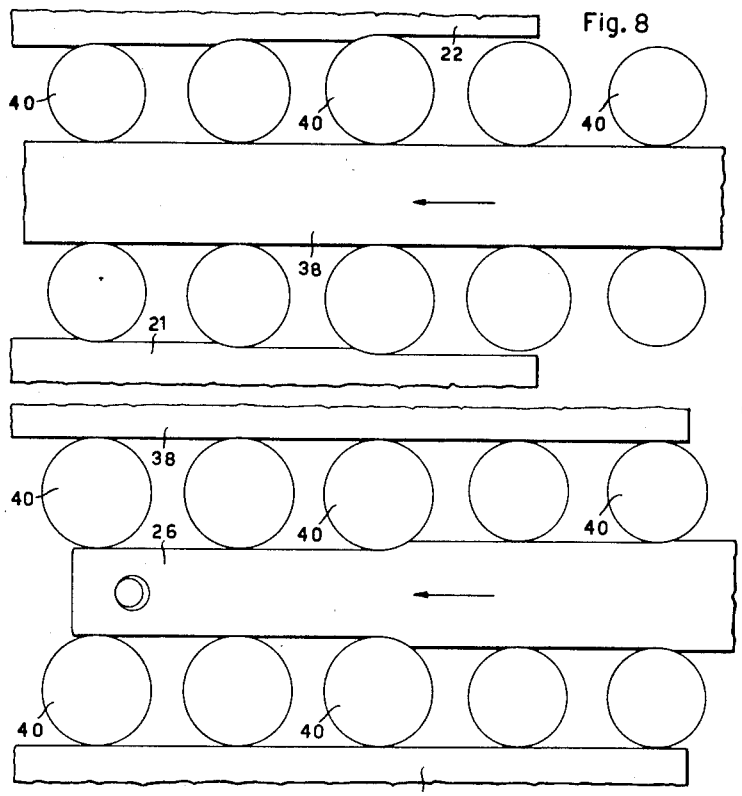
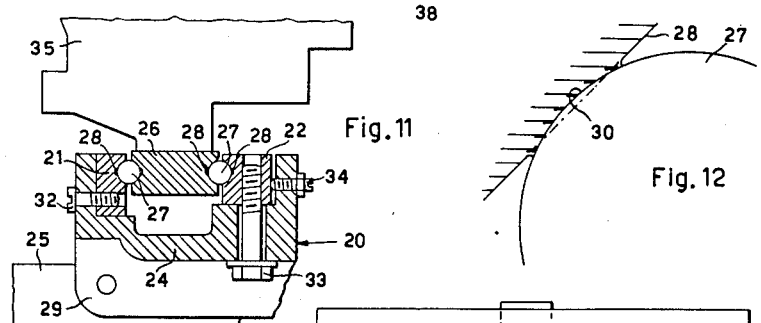
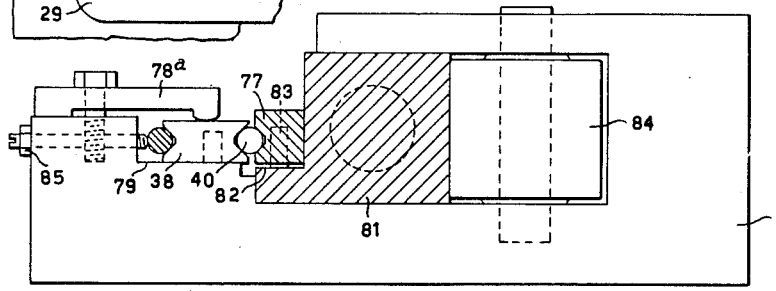
INVENTOR.
John F. Heyer
BY
John Taggenburger
AGENT United States Patent Office 3,245,512
Patented Apr. 12, 1966

3,245,512
CARRIAGE RAILS AND METHOD AND
APPARATUS OF MANUFACTURE
John F. Heyer, West Hartford, Conn., assignor to Olivetti Underwood Corporation, a corporation of Delaware
Filed Mar. 22, 1963, Ser. No. 267,252
10 Claims. (Cl. 197—69)

This invention relates generally to office equipment machines, such as typewriters and adding machines, wherein guideway races with antifriction rolling elements interposed between them provide for rectilinear guidance of a carriage. The said guide races are usually in the form of grooves provided in guide rails, and said rolling elements are either in the form of balls or rolls.

As is well known, the carriages in such machines are abruptly arrested incident to carriage stepping, tabulations and carriage returns, and, consequently, there are imposed severe localized shocks on the guide rails on the points of contact of the rolling elements. It is also common knowledge that the provision of balls is more advantageous than rollers insofar as self alignment of rails is concerned, but gives more localized contact conducive to damage of the raceway.

In order to prevent damage of the raceways in the guide rails, it has been common practice to case harden the guide rails or the raceway surfaces thereof. In some machines the raceways have been in the form of hardened steel inlays and in still other machines durable raceways were produced by metal spray of hard steel which needed to be expensively ground.

All such prior guide rails have entailed great costs of manufacture and it is therefore a main object of the invention to provide durable and smoothly operative guideways which are manufacturable at extremely low cost.

Another object is to provide an unhardened metallic rail structure wherein there are provided compacted material raceway surfaces which are hard, smooth and have efficiently been produced by rolling action of balls.

Other objects of the invention are to produce the guide rails of the invention by efficiently effective apparatus and method.

Now specifically referring to the drawings:

FIGURE 1 is a reduced-scale plan view of an apparatus for ball-rolling raceways on a guide rail of a typewriter carriage which is to be frame-supported;

FIGURE 2 is a plan view of the apparatus of FIGURE 1, but modifiedly conditioned for rolling raceways on a guide rail which is to become part of a typewriter carriage;

FIGURE 3 is a fractional front elevation of portions of the apparatus seen in FIGURE 1;

FIGURE 8 is a diagrammatic plan view depicting the rolling of raceways on a guide rail which is to be frame supported, the apparatus being that of FIGURE 1;

FIGURE 9 is similar to FIGURE 8, but depicts diagrammatically the rolling of raceways by the modifiedly conditioned apparatus of FIGURE 2;

FIGURE 10 is a perspective view of a portion of a raceway rolling tool-ball carrier;

FIGURE 11 is a sectional side elevation of a portion of a typewriter showing principally the rail structure which includes the rolled raceways of the invention;

FIGURE 12 illustrates very greatly enlarged, compacted-metal, hard-skin ball curvature conforming raceways which the typewriter of FIGURE 11 embodies; and, FIGURE 13 is a sectional side elevation of a modified form of an apparatus for producing ball rolled raceways.

Figure 4:
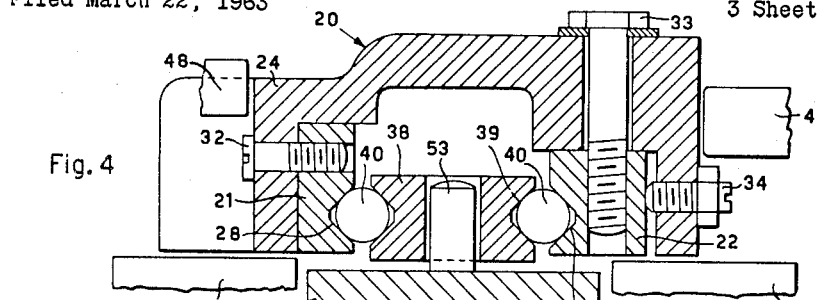
FIGURE 4 is an enlarged-scale sectional side elevation of the apparatus seen in FIGURE 1, taken generally along line 4—4 of such figure.

Having now reference to FIGURE 11, it shows a frame-supported guide rail structure 20 of a typewriter embodying a front rail 21 and a rear rail 22 of unhardened steel carried in an elongate element 24 of substantially U-shaped form which preferably is a casting. The latter has two downreaching flanges 29 by which it is rigidly borne on side walls 25 of the machine. Between the said rails 21 and 22, there is movably mounted a carriage supporting guide rail 26, there being antifriction balls 27 interposed between oppositely facing, generally V shaped grooves 28 provided on the rails 21, 22 and 26, as shown. Each of the sides of the grooves 28 has a ball-rolled raceway as shown at 30 in FIGURE 12 in greatly enlarged aspect. The material at each such raceway 30 has been compacted to afford a hard-layer skin indicated by local emphasis in the section lines. Said raceways 30 afford wide, ball-conforming contact areas for the balls 27 and due to the hard rolled nature thereof withstand the pounding shocks of the balls 27 without damage.

The front rail 21 is carried fast on the casting 24 by screws 32, as shown. The rear rail 22 is carried also fast on the casting 24, as by clamping screws 33. Assisted by provision of a series of set screws 34, said rear rail 22 can be accurately adjusted to give the carriage rail 26 the desired accurate, but free-running fit between the balls 27. The numeral 35 indicates a carriage end fast on the carriage guide rail 26.

In FIGURE 1, there is shown an apparatus or machine for ball-rolling into the V-shaped grooves 28 of the soft metallic rail structure 20, the desired hard-layer, ball curvature-conforming raceways 30. The said rail structure 20 is adapted to be received on said apparatus in an inverted position, as shown, resting on four upright studs 36 provided on a plate 37. The manner in which said rail structure 20 is received on said studs is also shown in FIGURE 4, wherein further a tool rail 38, provided with oppositely facing hard, non-deformable, straight-line, raceways 39 is shown between the rails 21, 22 with hardened tool balls 40 introduced for raceway rolling action on the grooves 28 of the rails 21, 22.

Referring now again to FIGURE 1, said apparatus embodies a long mechanism-supporting beam 41. The aforestated plate 37 is removably secured upon this beam by screws 42. The plate has on each of the four corners thereof a vertical wall member 43. Each rear member 43 affords a protuberance 44 to locate the rail structure 20 thereagainst. Furthermore, a wide U-shaped member 45 is carried on the members 43 in notches thereof by hinge pins 46. The member 45 embodies a handle 47 to allow its manipulation for the apparatus to receive the rail structure 20. Upon lowering the member 45, its two side portions straddle closely the two flanges 29 of the rail structure 20 and a finger portion 48 confines the rail structure at the front. By providing notches in the two front wall members 43 to receive the side portions of the member 45 thereat, the latter is given additional support. The structure 37, 43, 45 constitutes a fixture which is removably mounted by the screws 42.

For receiving the tool rail 38, the apparatus has arranged to travel slidably lengthwise of the beam 41, a strong bar or slide 50 of generally square cross section. The aforestated studs 36, along with a series of further studs 51 on the beam 41 to each side of the apparatus, arranged in pairs, serve to guide the bar 50. Said studs 36 and 51 have bar-guiding notches 52. The bar 50 is normally disposed in a rightward position, approximately as indicated in FIGURES 1 and 3 for receiving the tool rail 38 beyond the right end of the soft rail structure 20 correlatedly thereto for passage therealong, so that each of its raceway grooves 39 faces one of the grooves 28 of the rail structure 20. For associating the tool rail 38 for movement with the bar or slide 50, the latter has at two spaced points a pin 53, only one being shown, and the tool rail 38 has oversize holes which together with said pins constitute a provision to facilitate a somewhat floating association.

The bar 50 is reciprocable leftwardly and rightwardly by a power-mechanism shown in FIGURE 1. The extent of power movement is such as to effect a relative longitudinal passage of the rail structures 20, 38, substantially from one end to the other end beyond each other. Said power-mechanism comprises a piston 55 reciprocably provided in a long cylinder 56 and having by a piston rod 57, a straight-line connection with the bar 50. Fluid pressure displacement of the piston 55 and thus the bar 50 is oppositely effected under the control of valve 58. Preferably the fluid is air and is supplied over a line 59. By manipulating a valve controlling handle 60, leftwardly or rightwardly, the piston 55 will be pressure moved respectively leftwardly or rightwardly. In the mid-position of the handle the air pressure is shut off from the piston and there is no motion. Each of the passages, except the final one, is made to leave one ball 40 between the rails.

Figure 5:
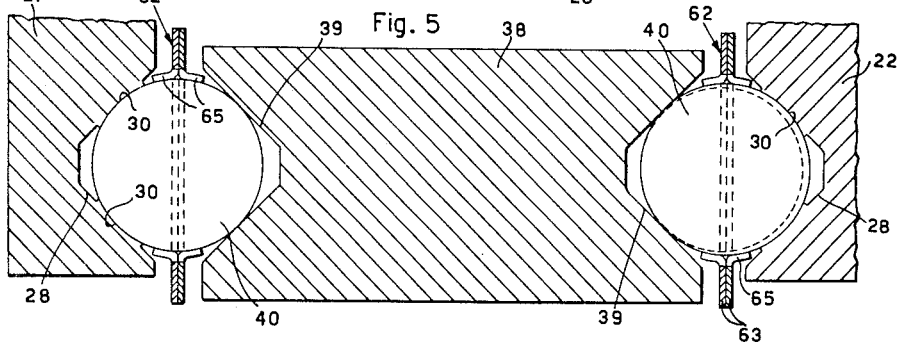
FIGURE 5 shows in further enlarged aspect some of the parts seen in FIGURE 4.

A fixture designated 62 affords support for the tool balls 40, there being two rows of the latter. As best seen in FIGURE 10, there is provided for the balls of each row a pair of flatly united steel strips 63 which at spaced points therealong have perforations 64 for accommodation of the tool balls 40. Each of the latter is retained by pairs of ears 65 bordering the perforations and extending oppositely from the strips 63 in snug, ball-retaining conformance. See also FIGURE 5. Each of the pairs of strips 63 are united by rivets 66 and a bridge element 67 ties them into a single unit, and, as seen in FIGURES 1, 8 and 10, the tool balls of the two rows are transversely aligned in pairs. The fixture 62 is adapted to be placed on the tool rail 38 by springing it thereover or sliding it endwise thereonto.

A raceway rolling operation results if the ball fixture 62 is manually urged leftwardly from the position shown in FIGURE 1, and then the tool rail 38 by manipulation of the valve 58 is caused to be power moved leftwardly. In such procedure, the leftmost tool ball of the two rows becomes introduced concomitantly between the facing grooves, pairwise in aligned relation transversely of the rails as clearly evident from FIGURE 8 and 10. In view of the stated size of the said leftmost balls, it is obvious that they exert some raceway rolling action on the grooves 21, 22.

FIGURE 8 diagrammatically shows the raceway rolling action performable by the apparatus of FIGURES 1 and 3. The leftmost pair of balls 40 are leading in the rolling action and are slightly larger than the freely available space in the grooves between the rails 21, 22 and the tool rail 38. The rolling friction afforded by such leftmost balls is such as to draw the fixture 62 along leftwardly and bring the pair of next larger balls into action. In an ascending order, the balls 40 of the next two pairs following the first pair are successively about .007 inch larger in diameter and then, as is evident from FIGURE 8, there may follow one or two pairs of balls which are slightly smaller. It will be seen that the raceway rolling action is effected in several easy rolling bites or steps so that the rails 21, 22 are not subject to undue bending strains. The first passage substantially forms the tool-ball-conforming raceways 30, but by three further passages they become smooth and accurate. It will be observed from FIGURES 4 and 5, that the tool rail 38 makes said passages in a floating and self aligning manner between the grooves 28 of the rails 21, 22 and that the rolling forces exerted on all the groove sides are balanced and equal, producing equal-depth raceways. Some of the material displaced by the rolling action forms the built up fringes of the raceways, as is clearly indicated in FIGURE 5 of the drawings.

Inasmuch as the first and the last ball 40 of each of the two successions are undersize in respect to balls therebetween, and it has been stated that incidental to opposite tool ball passages a final such undersize ball is left between the rails, it follows that the total opposite rolling passage is not less than twice the length of the soft metallic rail structure. Furthermore, from what has been stated in reference to FIGURE 8, it is obvious that the spacing of the grooves 28 of said soft metallic rail structure, relative to the spacing of the grooves 39 on the tool rail 38 is so correlated that the freely available space between the facing grooves is somewhat less than would be required to accommodate the leftmost or leading tool ball therebetween in a tight but free-rolling manner.

Figure 6:
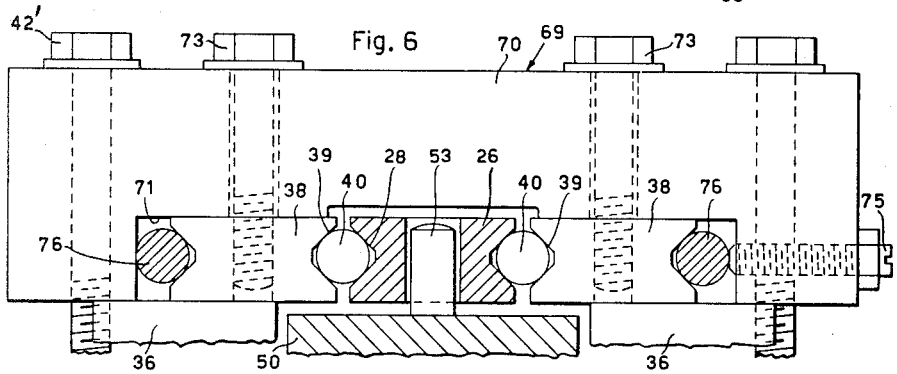
FIGURE 6 is an enlarged-scale sectional side elevation of the modifiedly conditioned apparatus seen in FIGURE 2, taken generally along line 6—6 of such figure.
Figure 7:
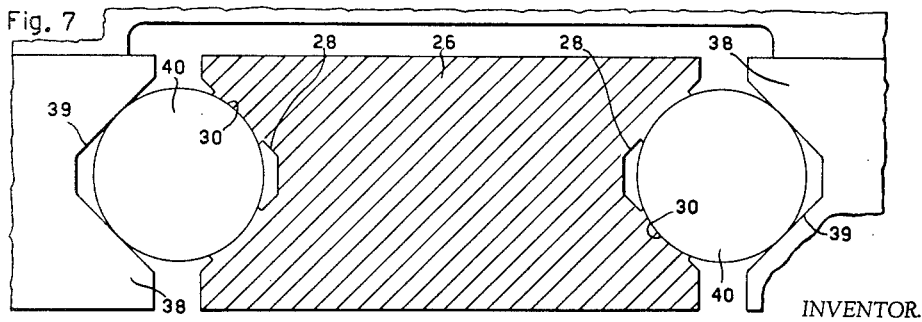
FIGURE 7 shows in further enlarged aspect some of the parts seen in FIGURE 6.

For rolling raceways 30 on the opposite grooves of the carriage guide rail 26, the apparatus of FIGURE 1 is modified to that shown in FIGURE 2. Such modification comprises a substitution of a tool-rail structure 69 for the fixture 37, 43, 45 of FIGURE 1. The details of this fixture 69 are shown in FIGURE 6. An elongate block 70 has a wide rectangular clearing 71 at its bottomside wherein two tool rails 38 are supported rigidly by screws 73. When said fixture 69 is in place on the studs 30 of the beam $41^1$, as fastened by the screws 42, and additionally the soft metallic carriage rail 26 is placed upon the bar 50, then said carriage rail is adapted to be given power passages between the tool rails 38 from beyond the end of the tool-rail structure. If incident to such operation tool balls 40 are introduced between the related grooves as said rail structures 26, 69 begin to overlap, then raceways 30 (see FIGURE 7) will be rolled into the grooves 28 of the carriage rail 26. Each of the two tool rails 38 may be provided with two grooves 39 but only the groove facing the rail 26 is in use. Either groove may be put in service. The spread of the tool-rail grooves in service is accurately establishable by the aid of a series of setscrews 75 and is unyielding. Said setscrews act on one of the two filler rods 76. The ball fixture 62 for rolling the raceways in the rail 26 preferably embodies two pairs of balls 40 of lead-in size shown at the right in FIGURE 9, and leftwardly thereof three pairs of maximum size balls. The ball races 30 on the rail 26 are thus substantially formed in a single rolling bite in the first passage but by further passages they are finished to perfection. Inasmuch as the rail 26 is received on the bar 50 loosely, it will adjust itself across the related grooves floatingly as the tool-balls are introduced therebetween and the raceways are being rolled.

In FIGURE 13 is shown an apparatus for rolling controlled-depth raceway surfaces into the sides of a single rectilinear groove of a soft metallic rail 77 and in a self-aligning and centering manner. A stationary block $78^a$ supports on a surface 79 through several clamps 78 thereon, a tool rail 38. Extending parallel to the tool rail 38 and slidably guided in the block 78 is a bar or slide 81 similar to the bar 50 of FIGURE 1. Between the tool rail 38 and the bar 81, on a shelf 82 of the latter and between spaced pins 83 on said shelf, there is adapted to be placed the stated rail 77. On the side of the bar 81 opposite to the tool rail 38, there are several rollers 84 turnable in the block 78. By lengthwise power moving the bar 81 and introducing tool balls 40 between the tool rail 38 and the rail 77, the groove in the latter will become subjected to controlled-depth and self-aligning and centering rolling action of the balls 40. The tool rail 38 during such operation is solidly backed up in adjusted position by set screws 85, whereby an accurate relationship of given separation or spread is defined for the rails 77 and 38, conducive to production of accurately rolled raceways 30 in the two sides of the groove in the rail 77.

Variation may be resorted to within the scope of the invention.

What is claimed is:

1. An apparatus to produce on a relatively soft metallic rail embodying a rectilinear groove, a mechanically compacted, hard-layer, smooth, ball-curvature conforming raceway surface along said groove, comprising,
   (a) a straight tool rail having a substantially rectilinear, hard groove constituting a non-deformable raceway,
   (b) means to correlate said tool rail and said soft metallic rail for passage relatively from beyond each other a distance at least twice the length of the soft metallic rail, and with the grooves of said rails passing and facing each other in opposition during such passage, comprising,
      (b1) means to support said rails slidably in respect to each other at a given parallel spread transversely between the grooves thereof,
      (b2) a tool ball introduceable between the grooves of said rails as said rails are given said relative passage along each other,
      (b3) said given groove spread and the size of the tool ball being correlated for the latter to roll material-displacingly and compactingly along the groove of said soft metallic rail while rolling reactingly but non-deformingly along the hard groove of the tool rail,
   (c) and power means to force at least one relative passage of said rails along each other from beyond each other, whereby a smooth, rectilinear, hard-layer, ball-curvature conforming raceway is rolled into the groove of the soft metallic rail for its full length.

2. An apparatus to produce on a relatively soft metallic rail embodying a rectilinear groove of generally rectangular form, two mechanically compacted, hard-layer, smooth, ball-size-conforming raceway surfaces along two angularly correlated sides of said groove, comprising,
   (a) a straight tool rail having therealong parallel thereto a rectilinear, hard groove constituting a ball raceway,
   (b) means to receive said tool rail and said soft metallic rail for passage relatively along each other from one end to the other end beyond each other and with the grooves in said rails passing and facing each other in opposition,
   (c) a hard, non-deformable tool ball introduceable between the grooves of said rails as said rails are given a passage along each other from beyond each other,
      (b1) said receiving means including means oppositely to cofine said rails slidably parallel to each other at a given spread transversely of said facing grooves which is correlated to the size of said tool ball for the latter to roll material-displacingly and compactingly along the groove sides of said soft metallic rail, rectilinearly, while reactingly rolling along the hard rectilinear groove of said tool rail,
   (d) and power means to force at least one relative passage of said rails along each other from one to the other end beyond each other, whereby a smooth, rectilinear, hard-layer ball-size-conforming raceway is produced by ball-rolling action along each of the two sides of the groove of the said soft rail for its full length, the rolling action of said tool ball displacing in each groove side of said soft metallic rail along the center of said rolled raceways some rail material, so that marginal fringe portions of raised material result along the raceway on both said groove sides.

3. An apparatus to produce on a relatively soft metallic rail embodying a rectilinear groove, a mechanically compacted, hard-layer, smooth, ball-size-conforming raceway surface along said groove, composing,
   (a) a straight tool rail having therealong parallel thereto a substantially non-deformable rectilinear, hard groove constituting a raceway,
   (b) means to correlate said tool rail and said soft metallic rail for passage relatively from beyond each other a distance at least twice the length of the soft metallic rail and with the grooves of said rails passing and facing each other in opposition during such passage, said correlating means comprising,
      (b1) means to confine said rails slidably in respect to each other at a given parallel spread transversely of said facing grooves of said rails,
      (b2) a succession of at least two tool balls of which a first ball is smallest and of which at least another is slightly larger,
   (c) a holder to retain said tool balls spaced from each other loosely in a succession,
   (d) said confining means being constituted to afford for said rails transversely of said grooves a spread relatively to the size of the smallest tool ball to cause the latter when introduced between the rails in a relative passage of said rails to roll with at least a small degree of material displacing and compacting rolling action along the groove of said soft metallic rail while rolling reactively but non-deformingly along the hard linear groove of said tool rail, said smallest ball through firm rolling contact caused by said confining means across the grooves of both said rails being instrumental through said ball holder to draw the successively larger ball into rolling association between said rails for the latter to effect a further material-displacing and compacting rolling action on the groove of said soft metallic rail,
   (e) and power means to force at least one relative passage of said rails along each other from beyond each other and rolling thereby a linear, ball-curvature conforming raceway into the groove of said soft metallic rail for its full length.

4. An apparatus to produce on a relatively soft metallic rail embodying a rectilinear groove, a mechanically compacted, hard-layer, smooth, ball-size-conforming raceway surface along said groove, comprising,
   (a) a straight tool rail having a substantially rectilinear, hard groove constituting a non-deformable raceway,
   (b) a frame,
   (c) means to support one of said rails on said frame with the groove thereof exposed free of the frame,
   (d) a rectilinear, elongate slide, means to support the other one of said rails on said slide longitudinally moveable therewith,
   (e) means including means on the frame to give said slide an accurately defined sliding support and so that the groove of the tool rail relatively to the non-compacted groove of the soft metallic rail is adopted to have a given spread transversely therebetween, and further so that the slide has an endwise range of movement for movement of the rail from beyond one end of said frame-supported-rail a distance in excess of twice the length of the soft metallic rail,
   (f) a tool ball introduceable between the grooves of said rails as said rails are given a relative passage along each other,
   (g) said given groove spread and the size of the tool ball being correlated for the latter to roll material-displacingly and compactingly along the groove of said soft metallic rail while rolling reactingly but non-deformingly along the hard groove of the tool rail,
   (h) and power means to force at least one relative passage of said rails along each other, whereby a smooth, rectilinear, hard layer, ball-size conforming raceway is rolled into the groove of the soft metallic rail for its full length.

5. An apparatus to produce on a unitary soft-metallic rail structure, by ball-rolling action concomitantly thereon on each of two spaced and transversely facing parallel grooves, a mechanically compacted, hard-layer, rectilinear smooth, ball-curvature-conforming raceway surface, said apparatus comprising,
   (a) a unitary tool-rail structure having two parallel, hard and non-deformable grooves, constituted relatively to said soft-metallic rail structure for association therewith so that each groove on the tool rail strucure is adapted to face an individually correlated one of said grooves on the soft metallic rail structure and so that the grooves of such correlations are adapted to face each other in opposition in a common plane,
   (b) means to correlate said rail structures for relative longitudinal passage from one end to the other end beyond each other and with said correlated grooves passing and facing each other,
   (c) at least one tool ball for introduction between each pair of facing grooves, the spacing of said grooves on said soft metallic rail structure relatively to the spacing of said grooves on said tool-rail structure being so correlated that the freely available space between the facing pairs of grooves is somewhat less than would be required to accommodate said tool balls between both of said pairs of grooves in a tight but free-rolling manner,
   (d) means to introduce concomitantly between each of the pairs of related grooves a tool ball while said rail structures begin to overlap in said relative passage,
   (e) and power means to force at least one relative passage of said rail structures from one to the other end beyond each other, whereby compacted-material, hard-layer, ball-curvature conforming raceways are rolled into both grooves of said soft metallic rail structure concomitantly.

6. The invention set forth in claim 5, said correlating means including means to facilitate self-alignment of the rail structures across the related pairs of grooves through said concomitant introduction of said tool balls.

7. An apparatus to produce on a unitary soft-metallic rail structure, by ball-rolling action concomitantly thereon on each of two spaced and transversely facing parallel grooves, a mechanically compacted, hard-layer rectilinear smooth ball-curvature-conforming raceway surface, comprising,
   (a) a unitary tool-rail structure having two parallel, hard and non-deformable grooves, constituted relatively to said soft-metallic rail structure for association therewith so that each groove on the tool rail structure is adapted to face an individually correlated one of said grooves on the soft metallic rail structure and so that the grooves of such correlations are adapted to face each other in opposition in a common plane,
   (b) means to correlate said rail structures for relative longitudinal passage from one end to the other end beyond each other and with said correlated grooves passing and facing each other,
   (c) a succession of at least two tool balls for introduction between each pair of facing grooves,
      (c1) a first such ball in each succession being the smallest and at least another following in each succession being larger,
   (d) the spacing of the grooves on said soft metallic rail structure relatively to that on said tool-rail structure being such that the aggregate space available between said correlated grooves is less than would be required to accommodate therebetween the smallest tool balls of said two successions in a tight but free-rolling manner,
   (e) a holder to retain the balls of said two successions in two loosely parallel rows in a corresponding paired arrangement transversely of said rows and being manipulative to introduce during a relative passage of said rail structures from one end to the other end beyond each other said smallest balls of said successions first between said correlated grooves,
   (f) and power means to effect at least one relative passage of said rail structures from one end to the other end beyond each other, the pair of smallest balls being caused to roll first between the related grooves and the pairs of balls of said successions which are successively larger being drawn by said holder into rolling engagement between the same grooves by each pair of precedingly smaller balls already rolling between said grooves, whereby compacted-material, hard-layer, ball-curvature conforming raceways are rolled into both grooves of said soft metallic rail structure concomitantly.

8. An apparatus to produce on a unitary soft-metallic rail structure, by ball-rolling action concomitantly thereon on each of two spaced and transversely facing parallel grooves, a mechanically compacted, hard-layer, rectilinear smooth, ball-curvature-conforming raceway surface, said apparatus comprising,
   (a) a unitary tool-rail structure having two parallel, hard and non-deformable grooves, constituted relatively to said soft-metallic rail structure for association therewith so that each groove on the tool rail structure is adapted to face an individually correlated one of said grooves on the soft metallic rail structure and so that the grooves of such correlations are adapted to face each other in opposition in a common plane,
   (b) a frame,
   (c) means to support one of said rail structures on said frame,
   (d) a rectilinear slide member,
   (e) means including guiding means on said frame, to give said slide member sliding support on said frame parallel to said frame-supported rail structure from one end beyond it in the direction to the other end for a distance in excess of twice the length of the soft metallic rail structure,
   (f) means to support said other rail structure on said slide member for longitudinal movement therewith, said rail structures being correlatedly supported on said frame and on said slide member so that the correlated grooves thereon are adapted to pass along each other in facing relation,
   (g) a tool ball for introduction between each pair of facing grooves,
   (h) the spacing of the grooves on said soft metallic rail structure relatively to that on said tool-rail structure being such that the aggregate space available between said correlated grooves is somewhat less than would be required to accommodate a tool ball between both of the pairs of related grooves in a tightly fitting but free-rolling manner,
   (i) means to introduce between the two pairs of related grooves of said rail structures concomitantly said tool balls while said slide-member supported rail structure is moved from beyond the other rail structure,
   (j) and power means to move said slide member for the distance stated, whereby compacted-material, hard-layer, ball curvature conforming raceways are concomitantly rolled into both grooves of said soft-metallic rail structure.

9. The invention set forth in claim 8, the supporting means for said rail structures including a provision to facilitate self-alignment of said rail structures across the grooves thereof by the tool balls introduced therebetween.

10. A carriage guide rail for use in a typewriter or the like, comprised of a soft metallic material and comprising a substantially rectangular groove rectilinearly extending therealong having along the groove-sides angularly facing toward each other for the full length of the rail, two ball curvature conforming compacted-material, hard-skin raceway surfaces which are continuously smooth and have raised-material, marginal fringes, said raceway surfaces and raised-material fringes having been produced through straight-line-guided, controlled-depth rolling action by ball means acting material-displacingly and compactingly along the sides of said groove in a continuous rectilinear rolling run.

References Cited in the file of this patent

UNITED STATES PATENTS

| | | | |
|---|---|---|---|
| 563,080 | 6/1896 | Shimer et al. | 197—69 |
| 805,839 | 11/1905 | Campbell | 197—69 |
| 1,158,369 | 10/1915 | Bunting | 308—241 |
| 1,457,169 | 5/1923 | Hess et al. | 197—69 |
| 1,469,784 | 10/1923 | Funk | 308—241 X |
| 1,500,116 | 7/1924 | Dowd | 197—69 |
| 1,647,847 | 11/1927 | Wills | 308—241 X |
| 1,748,037 | 2/1930 | Leach | 308—241 |
| 2,063,677 | 12/1936 | Hughes et al. | 80—60 |
| 2,223,799 | 12/1940 | Annen | 29—148.4 X |
| 2,719,765 | 10/1955 | Menne | 29—148.4 |
| 2,783,528 | 3/1957 | Menne | 29—148.4 |
| 2,787,176 | 4/1957 | Smith | 80—31.1 |
| 2,812,222 | 11/1957 | Gussack | 308—6 |
| 2,860,930 | 11/1958 | Schafranik | 308—6 |
| 2,883,738 | 4/1959 | Morrow | 29—149.5 |
| 2,950,149 | 8/1960 | Thomson | 308—241 X |

FOREIGN PATENTS

| | | |
|---|---|---|
| 156,112 | 6/1920 | Great Britain. |

ROBERT E. PULFREY, *Primary Examiner.*